United States Patent
Sikljovan et al.

(10) Patent No.: US 9,619,801 B2
(45) Date of Patent: Apr. 11, 2017

(54) USER POSITIVE APPROVAL AND AUTHENTICATION SERVICES (UPAAS)

(75) Inventors: Branislav Sikljovan, Guelph (CA); Radosav Andric, Etobicoke (CA)

(73) Assignee: Stanton Management Group, Inc., Binghamton, NY (US)

( * ) Notice: Subject to any disclaimer, the term of this patent is extended or adjusted under 35 U.S.C. 154(b) by 591 days.

(21) Appl. No.: 12/848,973

(22) Filed: Aug. 2, 2010

(65) Prior Publication Data
US 2012/0030114 A1 Feb. 2, 2012

(51) Int. Cl.
*G06Q 20/40* (2012.01)
*H04W 12/06* (2009.01)

(52) U.S. Cl.
CPC ......... *G06Q 20/40* (2013.01); *G06Q 20/4012* (2013.01); *H04W 12/06* (2013.01)

(58) Field of Classification Search
CPC .... G06Q 20/40; G06Q 20/32; G06Q 20/3821; G06Q 20/20; G06Q 20/4012; G07F 7/1008; G07F 7/10; H04W 12/06; G06F 21/31; G06F 2221/2107; H04L 63/083
USPC .............................................. 705/35–45, 1.1
See application file for complete search history.

(56) References Cited

U.S. PATENT DOCUMENTS

| | | | | |
|---|---|---|---|---|
| 6,895,391 B1* | 5/2005 | Kausik | ............. | G06F 21/34 705/50 |
| 7,110,792 B2* | 9/2006 | Rosenberg | ............. | G06Q 20/085 235/380 |
| 8,140,418 B1* | 3/2012 | Casey | ............. | G06Q 20/10 370/401 |
| 8,566,239 B2* | 10/2013 | Arthur | ............. | G06Q 20/105 705/41 |
| 8,577,804 B1* | 11/2013 | Bacastow | ............. | G06Q 20/027 235/380 |
| 2005/0240522 A1* | 10/2005 | Kranzley | ............. | G06Q 20/02 705/40 |
| 2006/0080243 A1* | 4/2006 | Kemper | ............. | G06Q 20/102 705/40 |
| 2006/0165060 A1* | 7/2006 | Dua | ............. | G06Q 20/20 370/352 |
| 2007/0052517 A1* | 3/2007 | Bishop | ............. | G06Q 20/10 340/5.2 |
| 2007/0125842 A1* | 6/2007 | Antoo | ............. | G06Q 20/0658 235/380 |

(Continued)

*Primary Examiner* — Mohammad Z Shaikh
(74) *Attorney, Agent, or Firm* — Maier & Maier, PLLC

(57) ABSTRACT

The invention provides Users of Retail Payment and Identification instruments with the ability to review transaction details and approve transaction by capturing UVM in User controlled environment and Issuers of these instruments with the ability to positively authenticate Users in Issuer controlled environment. The invention accounts for real time legacy or non-legacy processing systems to provide an authorization request from POA to Issuer Host. The invention introduces two UPAAS components—User Gateway and User Application. The UPAAS User Gateway is implemented in an Issuer controlled environment enabling interface between Issuer legacy Host and UPAAS User Applications. The UPAAS User Application can be implemented on any device supporting communication protocol such as TCP/IP without any hardware changes enabling the User to login to UPAAS User Gateway, review and approve or decline a specific transaction in real time by entering UVM, such as PIN, for User authentication purposes.

5 Claims, 6 Drawing Sheets

(56) References Cited

U.S. PATENT DOCUMENTS

| | | | |
|---|---|---|---|
| 2007/0262136 A1* | 11/2007 | Ou | G06Q 20/04 235/380 |
| 2008/0288405 A1* | 11/2008 | John | G06Q 20/40 705/44 |
| 2009/0287936 A1* | 11/2009 | Ohkado | 713/183 |
| 2010/0291895 A1* | 11/2010 | Drzyzga | G06Q 20/32 455/410 |
| 2010/0312703 A1* | 12/2010 | Kulpati | G06Q 20/32 705/44 |
| 2010/0317318 A1* | 12/2010 | Carter | G06Q 20/20 455/408 |
| 2010/0318446 A1* | 12/2010 | Carter | G06Q 20/105 705/30 |
| 2011/0006113 A1* | 1/2011 | Uchikura | G06Q 20/10 235/380 |
| 2011/0251910 A1* | 10/2011 | Dimmick | G06Q 20/12 705/17 |

* cited by examiner

USER POSITIVE APPROVAL AND AUTHENTICATION SERVICES (UPAAS)

BACKGROUND OF THE INVENTION

The foundation of the invention was a realization of the existing problems and opportunities that emerging technologies are bringing along in the areas of transaction approval and User authentication for Retail Payment and Identification transactions.

Recognized Problems

For a number of years the Card industry has been facing demands for a stronger Cardholder authentication and better protection of User and Payment instrument proprietary information. The Card industry responded with EMV-chip cards where an offline PIN was introduced replacing or substituting signature as CVM. An Offline PIN is significantly more reliable than a signature however it came with a price: the cost of EMV implementation and maintenance is significant and is billed to all parties: Merchants/POA, Acquirer, Network and Issuers. Another downside is that the PIN remained captured at POA and User verification remained within the POA environment. To mitigate the risks the Payment Card Industry (PCI) introduced PED and Data Security standards which improved security however also further increased the cost of implementation and maintenance. Verification of a CVM at the POA means that the Issuer is advised of the Cardholder Verification Result, but not actually performing User authentication, which opens up doors for "wedge" (man-in-the middle) attacks and other fraud risks.

The personal and traveler's cheques industry currently provides the ability to validate the cheques or drafts being presented, verify the history of the User (account holder), to validate the Routing Number and verify the User Account number status, However User authentication is not currently available for cheque transactions which along with the cost of Cheque Verification processing contributed to the constant decline of cheque use.

Users of identification instruments like Insurance and Health cards are either not authenticated at all or the authentication is performed by the acceptor using other pictured IDs, like a Driver's license.

Perceived Opportunities

Mass adoption of data enabled devices enables a reach to Users of Retail payment and Identification instruments in real time, anytime, anywhere enabling User transaction approval and User authentication in Issuer controlled environment that was previously not possible.

Providing Users of Payment and Identification instruments with the ability to review and approve transactions and enter UVMs at the devices they control improves the security of UVM and effectively externalizes User Transaction approval and User authentication from POA/acceptor's environment thus removing the line between User (Cardholder) Present and User (Cardholder) Not Present transactions.

User Transaction approval and User authentication naturally belong to Issuer environment. Ensuring this decouples the Payment Instrument information (processed in authorization request/response) from User Authentication information which significantly contributes to fraud prevention.

BRIEF SUMMARY OF THE INVENTION

The invention accounts for legacy or non-legacy real time processing systems providing transaction details captured at a POA to the Issuer Host through an Acquirer and when appropriate Network environment in the form of transaction authorization request. At a minimum the Transaction authorization request provides Payment or Identification Instrument ID (i.e. Primary Account Number), POA information (i.e. Acceptor Name and Location) and Transaction Amount.

The Invention Introduces Two Components:
UPAAS User Gateway (125) implemented in Issuer controlled environment which facilitates processing of Approval Request/Response between Issuer Card, Card-less or ID Legacy systems and UPAAS User Application (122).

UPAAS User Application (122) which can be implemented on any device supporting appropriate data communication protocol such as TCP/IP. It provides Users with ability to review and accept or decline the transaction once the authorization request is received by the Issuer. The User confirms acceptance of a transaction by entering UVM which is encrypted by the UPAAS User application and forwarded to Issuer for User authentication and Issuer approval.

The invention externalizes User Authentication from a legacy POA, Acquiring and Network systems and enables Issuers of Retail Payment and Identification instruments with ability to positively authenticate Users of these instruments in real time in Issuer controlled environment without any involvement of POA, acquiring and network systems in User authentication.

The invention externalizes User transaction approval from a legacy POA and enables Issuers of Retail Payment and Identification instruments with ability to request a transaction approval from Users in real time after the Issuer receives authorization request for the transaction and before the Issuer approval is granted. As a result of this the invention makes the Issuer approval contingent to the User's approval ensuring non-repudiation of Issuer approved transactions.

The invention provides Users of Retail Payment and Identification instruments with the ability to review and approve or decline transaction and capture UVM on self controlled devices, thus decoupling Point of (Instrument) Acceptance from Point of Transaction Approval and Point of User Authentication, which effectively removes the line between User Present and User Not-Present transactions.

By externalizing User Authentication from the POA the invention ensures that the Payment Instrument information (i.e. Primary Account Number) and User Verification information (i.e. PIN) are neither captured nor processed together at any point of the transaction life cycle. This prevents the association of the Instrument and UVM information by anyone but the User and Issuer, thus reducing the possibility of creating and using the counterfeit instruments.

The Major Benefits of the Invention are the Following:
No physical changes or modifications are required to devices where the UPAAS User Application is implemented.

Issuer performs User Authentication in its own environment which is currently possible for ATM on-us transactions only. The same increases transaction security and simplifies implementation and change management: any modification or improvements can be done without impacts to Merchant, Acquirer and Network environments.

Acceptors of Payment or Identification instruments are spared from implementing and maintaining User Authentication functions at their POA devices while enjoying increased guarantee of payment and non-repudiation.

Acquirer processors and Networks are spared from implementing and maintaining Industry mandates related to User authentication and data security standards including but not limited to secure UVM capture, encryption and support of associated key infrastructure.

Users are provided with the opportunity to review and approve or decline the transaction in a self controlled environment and the ability to identify and decline a fraudulent or incorrectly processed transaction request before it is processed by the Issuer Host.

BRIEF DESCRIPTION OF THE SEVERAL VIEWS OF THE DRAWINGS

The drawings provided herein present possible implementation scenarios of the invention. These scenarios should be taken as examples only and they are not meant to limit implementation of the invention beyond presented scenarios, nor limit the scope, implementation type or configuration of the invention providing that the spirit of the invention is preserved as set forth in the invention claims.

DETAILED DESCRIPTION OF THE INVENTION

Details of end-to end transaction flow and User transaction approval and User Authentication processes are as presented in FIGS. 1-6 and corresponding descriptions in the tables below.

TABLE 1

Figure 1:
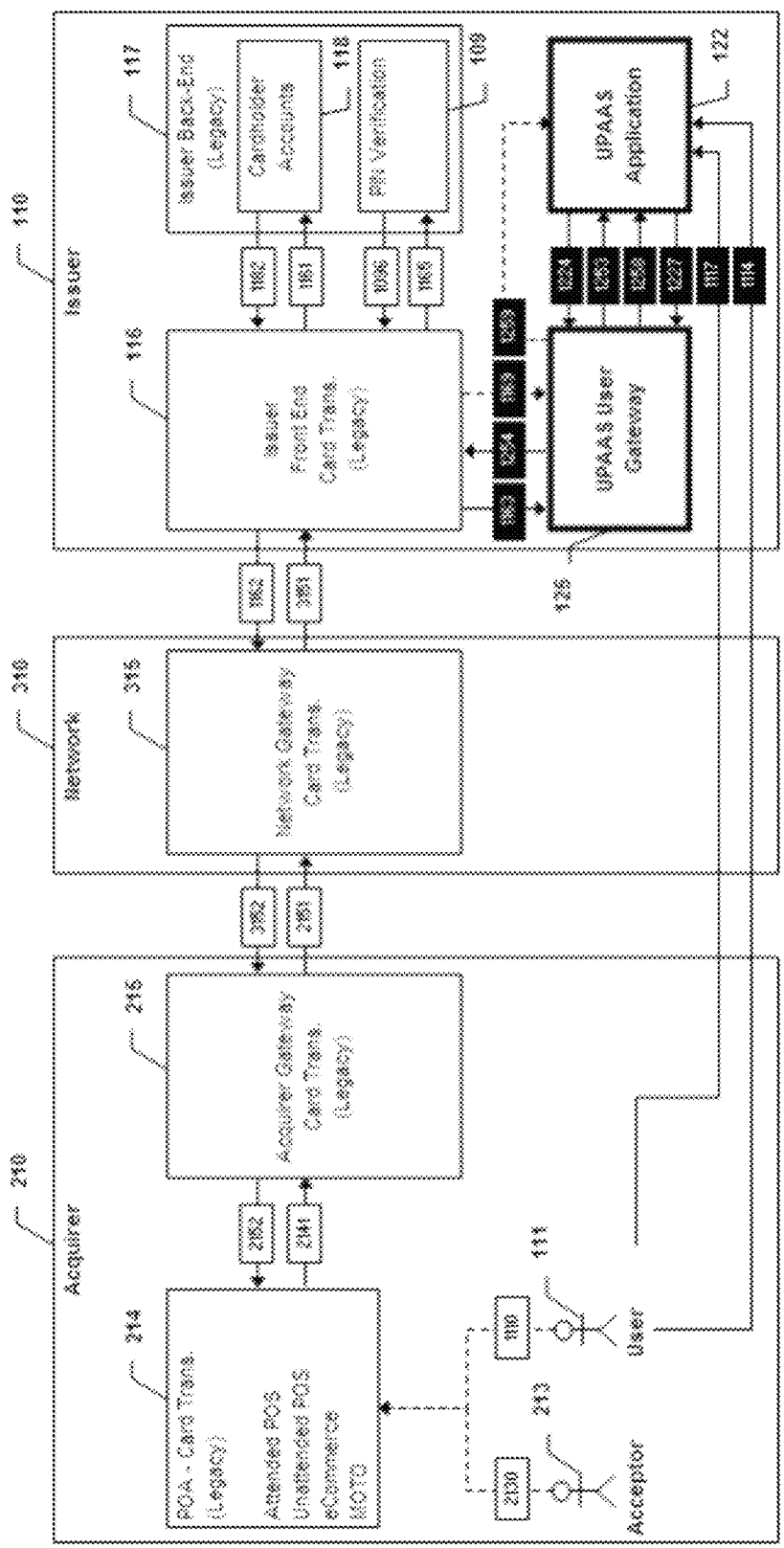
FIG. 1 presents a process flow of the embodiment enabling transaction approvals to Users and User Authentication to Issuers of non-proprietary Card Retail Payment Instruments in legacy Open Loop scenario where Issuer uses its legacy system for PIN verification.

Detailed description of process flow and relevant business logic exercised in UPAAS implementation scenario presented in FIG. 1 where User Approval and Authentication processes are exercised for Card retail payment transactions initiated and processed in an Open Loop Card Legacy environment where Issuer verifies PIN in its legacy environment.

| | |
|---|---|
| 1110 | If unattended POA 111 swipes card; If eCommerce transaction 111 enters Card number and other requested information (i.e. CVV2/CVC2) as requested by e-Commerce web site. |
| 2130 | If attended POA 213 swipes card and enters amount; If MOTO 213 enters Card number and amount; |
| 1117 | 111 activates 122 in order to establish connection with 125 |
| 1227 | 122 sends Login Request to 125 where User Name is implicitly provided by 122. Subject to Issuer requirements Password is either entered by 111 or implicitly provided by 122 |
| 1258 | 125 verifies User Name & Password, checks 111 status and if valid sends Login Response to 122/establishes an open session and awaits for Approval Request from 116 |
| 2141 | 214 sends Authorization Request to 215 with appropriate 214 information, Transaction Amount and captured Card Information |
| 2151 | 215 enriches Authorization Request with appropriate acquirer and merchant information and Forwards Authorization Request to 315 |
| 3151 | 315 identifies 116 based on PAN BIN and forwards Authorization Request to 116 |
| 1163 | 116 checks PAN provided in 3151 to determine if 111 is registered for UPAAS services and if yes sends Approval Request to 125 with PAN, 214 information and Transaction Amount |
| 1253 | 125 identifies 122 using PAN, checks 122 status and if valid sends Approval Request to 122 |
| 1114 | 111 reviews 214 Name & Location, Transaction Amount as received in 1253 and displayed by 122 and confirms acceptance by entering PIN and "From Account Type" |
| 1224 | 122 sends Approval Response to 125 with encrypted PIN Block and "From Account" type |
| 1254 | 125 sends Approval Response to 116 with encrypted PIN Block and "From Account" type |
| 1165 | 116 sends PIN Verification Request to 109 |
| 1096 | 109 verifies PIN and sends PIN Verification Response to 116 |
| 1161 | 116 sends Fund Authorization Request to 118 |
| 1182 | 118 verifies account balance/open to buy and sends Authorization Response to 116 |

TABLE 1-continued

Detailed description of process flow and relevant business logic exercised in
UPAAS implementation scenario presented in FIG. 1 where User Approval and
Authentication processes are exercised for Card retail payment transactions
initiated and processed in an Open Loop Card Legacy environment where Issuer
verifies PIN in its legacy environment.

1162  116 sends Authorization Response to 315
3152  315 forwards Authorization Response to 215
2152  215 forwards Authorization Response to 214 at which point goods or services are
      granted to 111
1169  Subject to Issuer Requirement 116 sends Authorization Advice to 125
1259  If 1169 received from 116 then 125 sends Authorization Advice to 122 at which
      point the session is closed

TABLE 2

Figure 2:
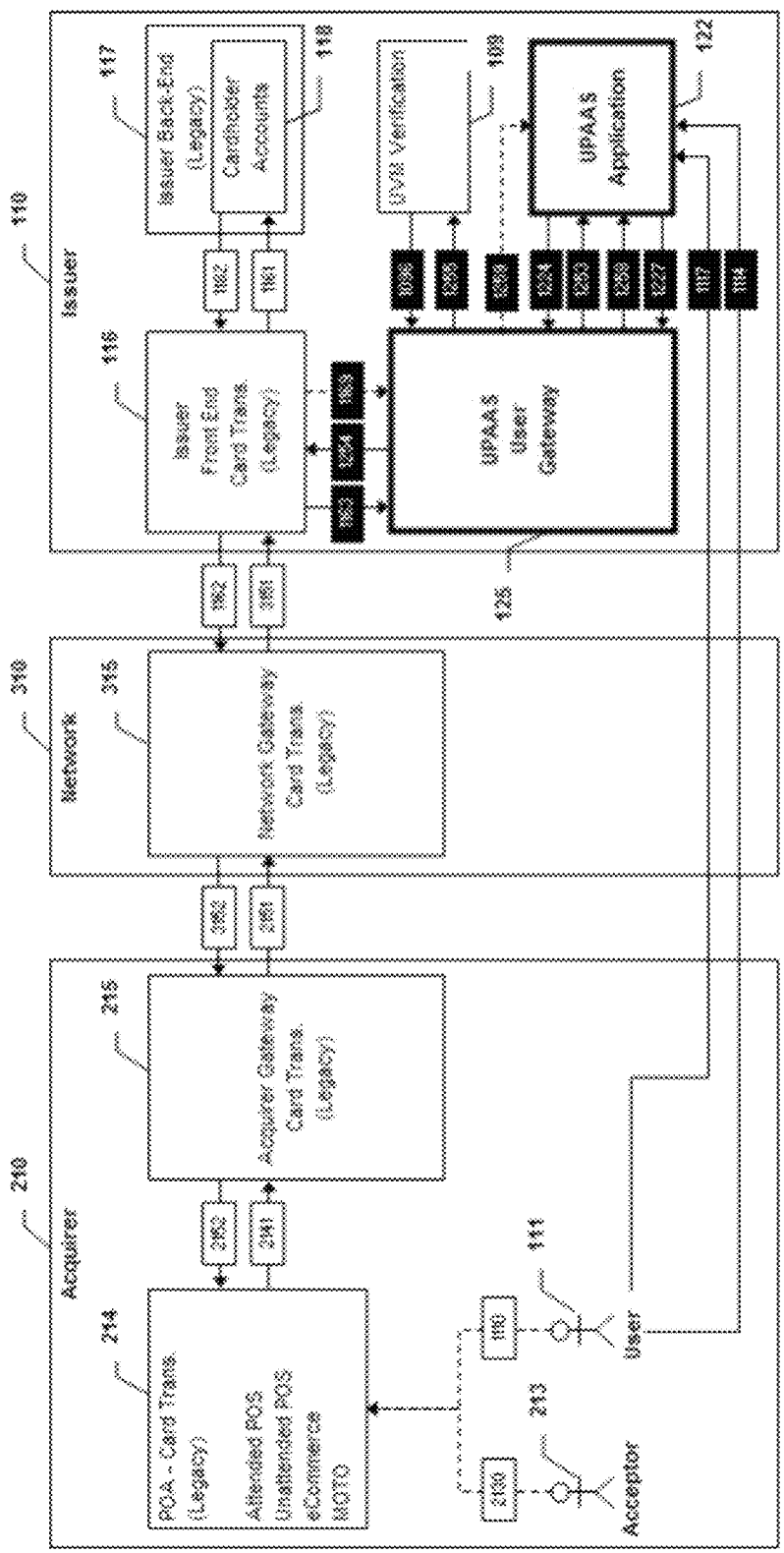
FIG. 2 presents a process flow of the embodiment enabling transaction approvals to Users and User Authentication to Issuers of non-proprietary Card Retail Payment Instruments in legacy Open Loop scenario where Issuer uses UPAAS for UVM verification.

Detailed description of process flow and relevant business logic exercised in
UPAAS implementation scenario presented in FIG. 2 where User Approval and
Authentication processes are exercised for Card retail payment transactions
initiated at and processed through an Open Loop Card Legacy environment
where UVM Verification is completed between the UPAAS User Gateway and
Issuer UVM Verification system.

1110  If unattended POA 111 swipes card; if eCommerce transaction 111 enters Card
      number and other requested information (i.e. CVV2/CVC2) as requested by e-
      Commerce web site.
2130  If attended POA 213 swipes card and enters amount; If MOTO 213 enters Card
      number and amount;
1117  111 activates 122 in order to establish connection with 125
1227  122 sends Login Request to 125 where User Name is implicitly provided by 122.
      Subject to Issuer requirements Password is either entered by 111 or implicitly
      provided by 122
1258  125 verifies User Name & Password, checks 111 status and if valid sends Login
      Response to 122/establishes an open session and awaits for Approval Request
      from 116
2141  214 sends Authorization Request to 215 with appropriate 214 information,
      Transaction Amount and captured Card Information
2151  215 enriches Authorization Request with appropriate acquirer and merchant
      information and Forwards Authorization Request to 315
3151  315 identifies 116 based on PAN BIN and forwards Authorization Request to 116
1163  116 checks PAN provided in 3151 to determine if 111 is registered for UPAAS
      services and if yes sends Approval Request to 125 with PAN, 214 information and
      Transaction Amount
1253  125 identifies 122 using PAN, checks 122 status and if valid sends Approval
      Request to 122
1114  111 reviews 214 Name & Location, Transaction Amount as displayed by 122 and
      confirms acceptance by entering UVM and "From Account Type"
1224  122 sends Approval Response to 125 with Encrypted UVM and "From Account"
      type
1255  125 sends UVM Verification Request to 109
1096  109 verifies UVM and sends UVM Verification Response to 125
1254  125 sends Approval Response to 116 with "From Account" type
1161  116 sends Fund Authorization Request to 118
1182  118 verifies account balance/open to buy and sends Authorization Response to
      116
1162  116 sends Authorization Response to 315
3152  315 forwards Authorization Response to 215
2152  215 forwards Authorization Response to 214 at which point goods or services are
      granted to 111
1169  Subject to Issuer Requirement 116 sends Authorization Advice to 125
1259  If 1169 received from 116 125 sends Authorization Advice to 122 at which point
      the session is closed

TABLE 3

Figure 3:
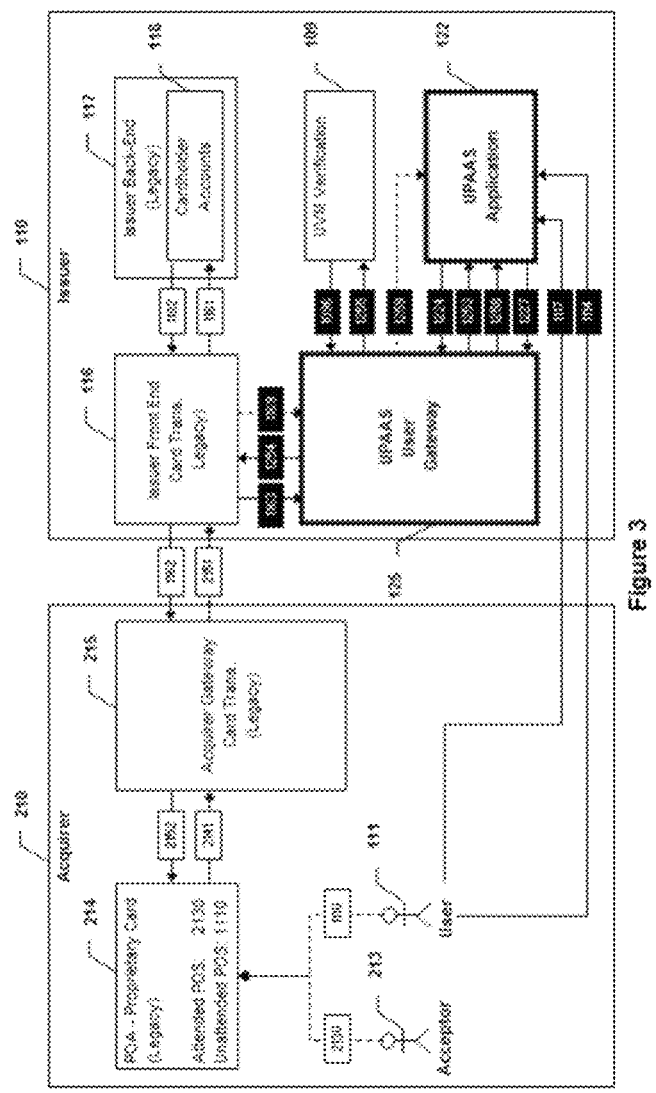
FIG. 3 presents a process flow of the embodiment enabling transaction approval to Users and User Authentication to Issuers of proprietary Card Retail Payment Instruments in legacy Closed Loop scenario where Issuer uses UPAAS for UVM verification.

Detailed description of process flow and relevant business logic exercised in
UPAAS implementation scenario presented in FIG. 3 where User Approval and
Authentication processes are exercised for Card retail payment transactions
initiated at and processed through a Closed Loop Card Legacy environment
where UVM Verification is completed between the UPAAS User Gateway and
Issuer UVM Verification system.

1110  If unattended POA 111 swipes card.
2130  If attended POA 213 swipes card and enters amount
1117  111 activates 122 in order to establish connection with 125

TABLE 3-continued

Detailed description of process flow and relevant business logic exercised in UPAAS implementation scenario presented in FIG. 3 where User Approval and Authentication processes are exercised for Card retail payment transactions initiated at and processed through a Closed Loop Card Legacy environment where UVM Verification is completed between the UPAAS User Gateway and Issuer UVM Verification system.

| | |
|---|---|
| 1227 | 122 sends Login Request to 125 where User Name is implicitly provided by 122. Subject to Issuer requirements Password is either entered by 111 or implicitly provided by 122 |
| 1258 | 125 verifies User Name & Password, checks 111 status and if valid sends Login Response to 122/establishes an open session and awaits for Approval Request from 116 |
| 2141 | 214 sends Authorization Request to 215 with appropriate 214 information, Transaction Amount and captured Card Information |
| 2151 | 215 enriches Authorization Request with appropriate acquirer and merchant information and Forwards Authorization Request to 116 |
| 1163 | 116 checks PAN provided in 3151 to determine if 111 is registered for UPAAS services and if yes sends Approval Request to 125 with PAN, 214 information and Transaction Amount |
| 1253 | 125 identifies 122 using PAN, checks 122 status and if valid sends Approval Request to 122 |
| 1114 | 111 reviews 214 Name & Location, Transaction Amount as displayed by 122 and confirms acceptance by entering UVM and "From Account Type" |
| 1224 | 122 sends Approval Response to 125 with UVM Block Encrypted and "From Account" type |
| 1255 | 125 sends UVM Verification Request to 109 |
| 1096 | 109 verifies UVM and sends UVM Verification Response to 125 |
| 1254 | 125 sends Approval Response to 116 with "From Account" type |
| 1161 | 116 sends Fund Authorization Request to 118 |
| 1182 | 118 verifies account balance/open to buy and sends Authorization Response to 116 |
| 1162 | 116 sends Authorization Response to 215 |
| 2152 | 215 forwards Authorization Response to 214 at which point goods or services are granted to 111 |
| 1169 | Subject to Issuer Requirement 116 sends Authorization Advice to 125 |
| 1259 | If 1169 received from 116 then 125 sends Authorization Advice to 122 at which point the session is closed |

TABLE 4

Figure 4:
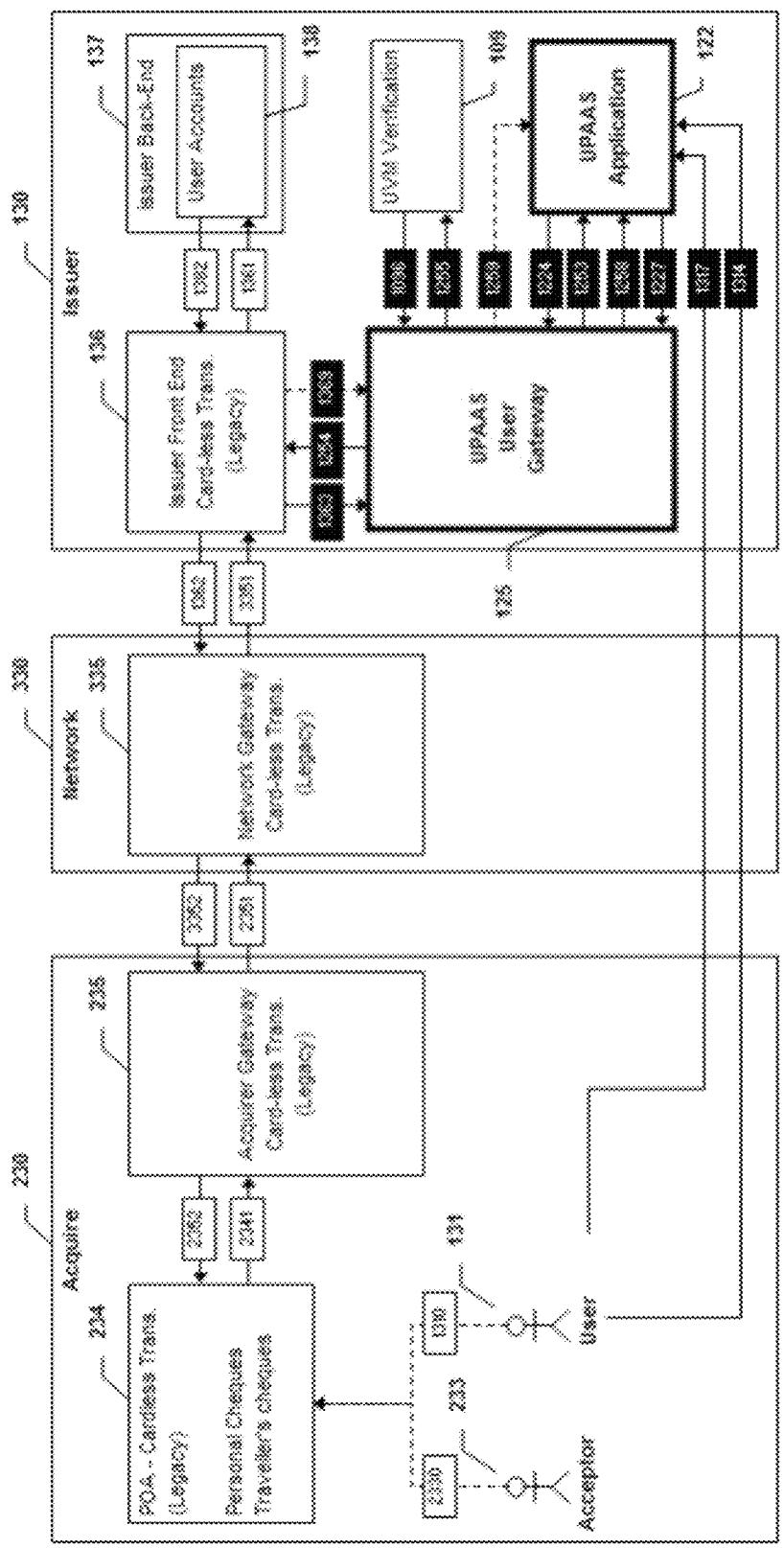
FIG. 4 presents a process flow of the embodiment enabling transaction approval to Users and User Authentication to Issuers of Card-less Retail Payment Instruments in legacy Open Loop scenario where Issuer uses UPAAS for UVM verification.

Detailed description of process flow and relevant business logic exercised in UPAAS implementation scenario presented in FIG. 4 where User Approval and Authentication processes are exercised for Card-less retail payment transactions initiated at and processed through an Open Loop Legacy environment where UVM Verification is completed between the UPAAS User Gateway and Issuer UVM Verification system.

| | |
|---|---|
| 2330 | 233 enters amount and Cheque number (manual entry or bar code read) |
| 1317 | 131 activates 122 in order to establish connection with 125 |
| 1227 | 122 sends Login Request to 125 where User Name is implicitly provided by 122. Subject to Issuer requirements Password is either entered by 131 or implicitly provided by 122 |
| 1258 | 125 verifies User Name & Password, checks 131 status and if valid sends Login Response to 122/establishes an open session and awaits for Approval Request from 136 |
| 2341 | 234 sends Cheque Verification Request to 235 with appropriate 234 information, Transaction Amount and captured Cheque Information |
| 2351 | 235 sends Cheque Verification Request with appropriate acquirer and merchant information to 335 |
| 3351 | 335 identifies 136 based on cheque number and forwards Cheque Verification Request to 136 |
| 1363 | 136 checks Cheque Number provided in 3351 to verify if 131 is registered for UPAAS services and if yes sends Approval Request to 125 with Cheque Number, 234 information and Transaction Amount |
| 1253 | 125 identifies 122 using Cheque Number, checks 122 status and if valid sends Approval Request to 122 |
| 1314 | 131 reviews Cheque Number, 234 Name & Location, Transaction Amount as displayed by 122 and confirms acceptance by entering UVM |
| 1224 | 122 sends Approval Response to 125 with encrypted UVM Block |
| 1255 | 125 sends UVM Verification Request to 109 |
| 1096 | 109 verifies UVM and sends UVM Verification Response to 125 |
| 1254 | 125 sends Approval Response to 136 |
| 1361 | 136 sends Fund Authorization Request to 138 |
| 1382 | 138 verifies account balance against requested amount and sends Fund Authorization Response to 136 |
| 1362 | 136 sends Cheque Verification Response to 335 |
| 3352 | 335 forwards Cheque Verification Response to 235 |

TABLE 4-continued

Detailed description of process flow and relevant business logic exercised in UPAAS implementation scenario presented in FIG. 4 where User Approval and Authentication processes are exercised for Card-less retail payment transactions initiated at and processed through an Open Loop Legacy environment where UVM Verification is completed between the UPAAS User Gateway and Issuer UVM Verification system.

2352 235 forwards Cheque Verification Response to 234 at which point goods or services or cash withdrawal is granted to 131
1369 Subject to Issuer Requirement 136 sends Cheque Verification Advice to 125
1259 If 1369 received from 136 then 125 sends Cheque Verification Advice to 122 at which point the session is closed

TABLE 5

Figure 5:
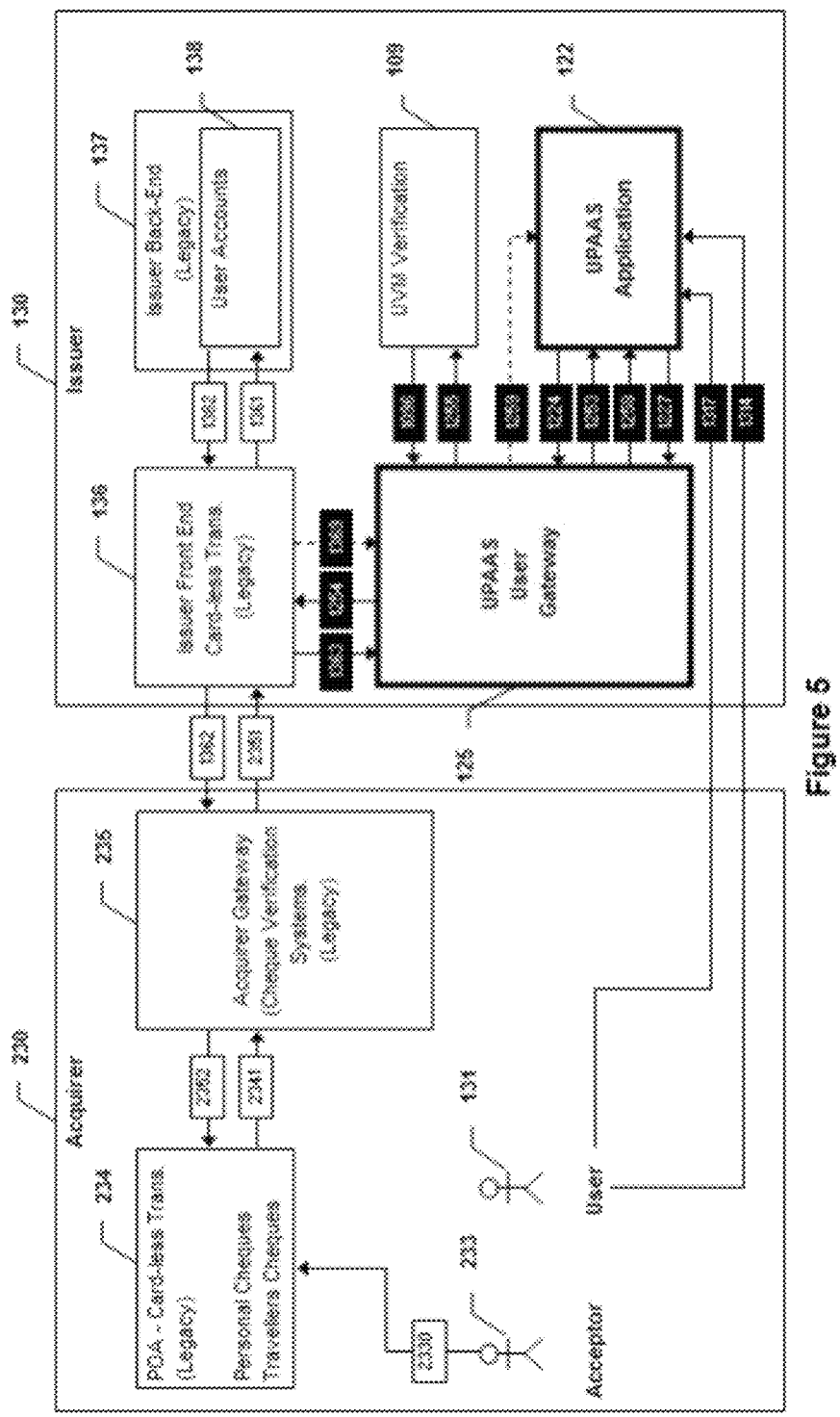
FIG. 5 presents a process flow of the embodiment enabling transaction approval to Users and User Authentication to Issuers of Card-less Retail Payment Instruments in legacy Closed Loop scenario where Issuer uses UPAAS for UVM verification.

Detailed description of process flow and relevant business logic exercised in UPAAS implementation scenario presented in FIG. 5 where User Approval and Authentication processes are exercised for Card-less retail payment transactions initiated at and processed through a Close Loop Legacy environment where UVM Verification is completed between the UPAAS User Gateway and Issuer UVM Verification system.

2330 233 enters amount and cheque number (manual entry or bar code read)
1317 131 activates 122 in order to establish connection with 125
1227 122 sends Login Request to 125 where User Name is implicitly provided by 122. Subject to Issuer requirements Password is either entered by 131 or implicitly provided by 122
1258 125 verifies User Name & Password, checks 131 status and if valid sends Login Response to 122/establishes an open session and awaits for Approval Request from 136
2341 234 sends Cheque Verification Request to 235 with appropriate 234 information, Transaction Amount and captured Cheque Information
2351 235 sends Cheque Verification Request with appropriate acquirer and merchant information to 136
1363 136 checks Cheque Number provided in 3351 to verify if 131 is registered for UPAAS services and if yes sends Approval Request to 125 with Cheque Number, 234 information and Transaction Amount
1253 125 identifies 122 using Cheque Number, checks 122 status and if valid sends Approval Request to 122
1314 131 reviews Cheque Number, 234 Name & Location, Transaction Amount as displayed by 122 and confirms acceptance by entering UVM
1224 122 sends Approval Response to 125 with encrypted UVM Block
1255 125 sends UVM Verification Request to 109
1096 109 verifies UVM and sends UVM Verification Response to 125
1254 125 sends Approval Response to 136
1361 136 sends Fund Authorization Request to 138
1382 138 verifies account balance against requested amount and sends Fund Authorization Response to 136
1362 136 sends Cheque Verification Response to 235
2352 235 forwards Cheque Verification Response to 234 at which point goods or services or cash withdrawal is granted to 131
1369 Subject to Issuer Requirement 136 sends Cheque Verification Advice to 125
1259 If 1369 received from 136 then 125 sends Cheque Verification Advice to 122 at which point the session is closed

TABLE 6

Figure 6:
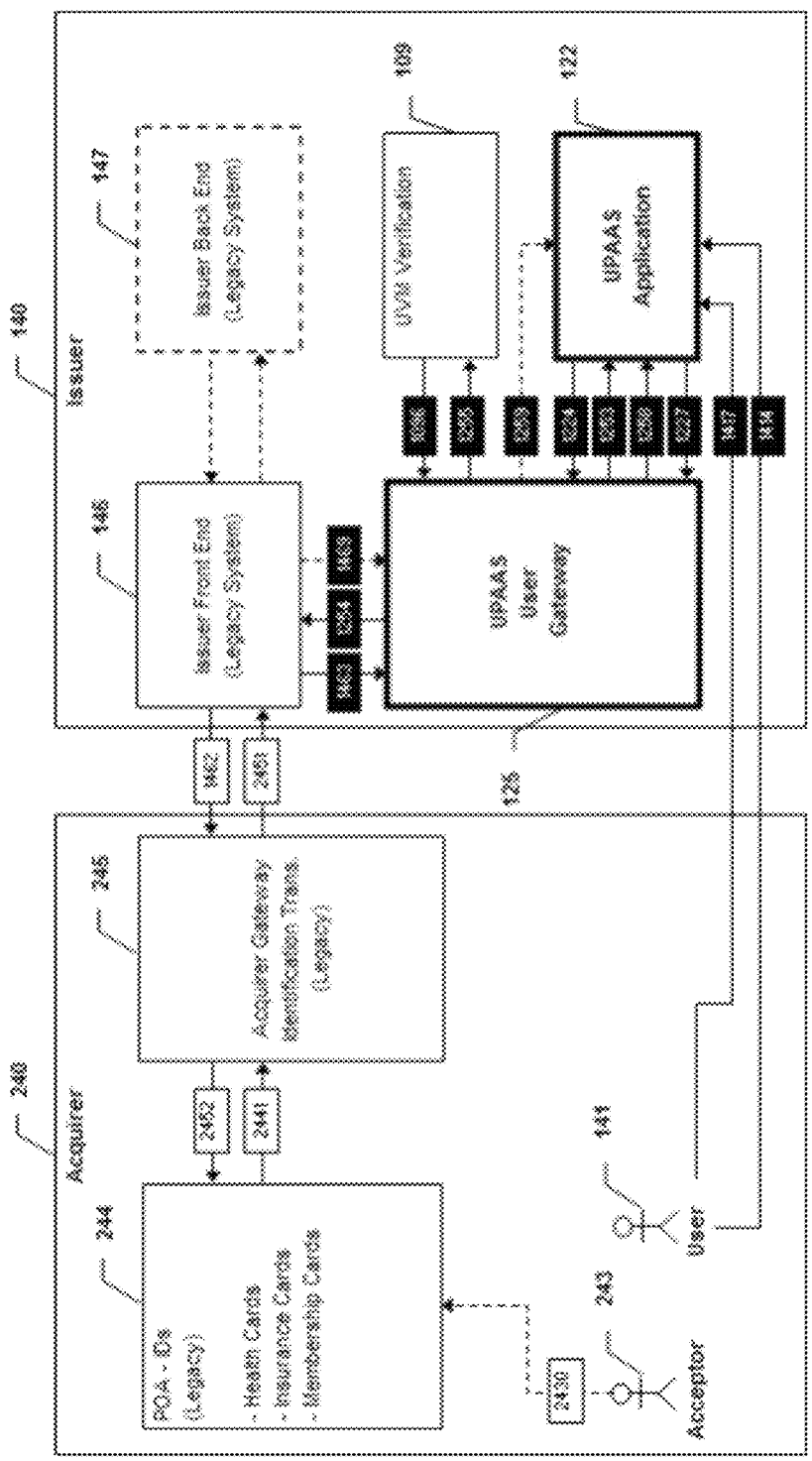
FIG. 6 presents a process flow of the embodiment enabling transaction approval to Users and User Authentication to Issuers when Identification Instruments are used in legacy Closed Loop scenario where Issuer uses UPAAS for UVM verification.

Detailed description of process flow and relevant business logic exercised in UPAAS implementation scenario presented in FIG. 6 where User Approval and Authentication processes are exercised for Identification instrument transactions initiated at and processed through a Close Loop processing environment where UVM Verification is completed between the UPAAS User Gateway and Issuer UVM Verification system 2430 243 enters ID Number (manually or through bar or magstripe read)
1417 141 activates 122 in order to establish connection with 125
1227 122 sends Login Request to 125 where User Name is implicitly provided by 122. Subject to Issuer requirements Password is either entered by 141 or implicitly provided by 122
1258 125 verifies User Name & Password, checks 141 status and if valid sends Login Response to 122/establishes an open session and awaits for Approval Request from 146
2441 244 sends ID Verification Request to 245 with appropriate 244 information and captured ID Information
2451 245 forwards ID Verification Request to 146

TABLE 6-continued

Detailed description of process flow and relevant business logic exercised in UPAAS implementation scenario presented in FIG. 6 where User Approval and Authentication processes are exercised for Identification instrument transactions initiated at and processed through a Close Loop processing environment where UVM Verification is completed between the UPAAS User Gateway and Issuer UVM Verification system 1463  146 checks ID provided in 2451 to determine if 141 is registered for UPAAS services and if yes sends Approval Request to 125 with 214 information
1253  125 identifies 122 using ID, checks its status and if valid sends Approval Request to 122
1414  141 reviews 244 Name & Location as displayed by 122 and confirms acceptance by entering UVM
1224  122 sends Approval Response to 125 with encrypted UVM Block
1255  125 sends UVM Verification Request to 109
1096  109 verifies UVM and sends UVM Verification Response to 125
1254  125 sends Approval Response to 146
1462  146 sends ID Verification Response to 245
2452  245 forwards ID Verification Response to 244 at which point User verification has been confirmed
1469  Subject to Issuer Requirement 146 sends ID Verification Advice to 125
1259  If 1469 received from 146 then 125 sends ID Verification Advice to 122 at which point the session is closed

The invention claimed is:

1. An apparatus for authenticating a User of a Retail Payment and Identification instrument as a precondition for confirming the User acceptance of the transaction, comprising:
   an Issuer Host for at least one Issuer of Retail Payment and Identification Instruments to authenticate the User, the Issuer Host being either an in-house or a third party solution interfacing with at least one Network and/or Acquirer Host for the purposes of receiving authorization requests and sending authorization responses, and programmed to connect to and communicate in real time with a User Gateway application by sending a User Approval request and receiving a User Approval response User Verification Method is encrypted;
   the User Gateway application implemented in an Issuer controlled environment and programmed to:
   connect to and communicate in real time with the Issuer Host for receiving the User Approval request from the Issuer Host; and
   connect to and communicate in real time with a User Application for the purpose of forwarding the User Approval request received from the Issuer Host to a User Application and receiving the User Approval response from the User Application,
   the User Application implemented on a data connected device and programmed to allow the User to sign in using the User Application and connect to and communicate in real time with the User Gateway application for receiving the User Approval request, capturing a unique User Verification Method from the User, and in response sending the User Approval response with the encrypted User Verification Method, where the encrypted User Verification Method is sent from the User Application through the User Gateway to the Issuer Host for verification without ever being captured, and outside of a Point of Acceptance environment where the transaction was initiated or processed through an Acquirer or Network environment through which a transaction authorization request was delivered to the issuer Host;
   wherein the issuer Host is further programmed to create and send the User Approval request to the User Gateway once the transaction authorization request is received from the Network or Acquirer and before the transaction authorization request is processed for approval by the issuer Host.

2. The apparatus of claim 1 wherein the User Application is programmed to:
   receiving the User Approval request from the User Gateway;
   displaying transaction information received in the User Approval request;
   prompting the User to enter the User Verification Method when the User selected to approve the transaction;
   prompting the User to enter additional information as it may be requested by the Issuer Host in the User Approval request;
   sending the User Approval response with the encrypted UVM to the User Gateway application.

3. The apparatus of claim 1 wherein the Issuer Host is further programmed to leverage information received in the User Approval response in the transaction authorization decision making processes.

4. The apparatus of claim 1, wherein the User Application and User Gateway application processes the User Approval request and response without having the information indicating the Point of Acceptance environment where the transaction for which approval is requested was initiated, or information indicating a form factor used to initiate the transaction or information indicating the method used to capture the Payment or Identification instrument information.

5. The apparatus of claim 1 wherein the User Gateway application, after receiving the User Approval request from the Issuer Host and before forwarding the request to the User Application, is further programmed to:
   confirming whether the User status is in a good order;
   identifying data connected device belonging to the User; and
   verifying that the User is signed in to the Gateway at a time when the Approval Request is received from the Issuer Host for this User.

* * * * *